United States Patent [19]

Rathband et al.

[11] 4,206,949
[45] Jun. 10, 1980

[54] CONTINUOUS QUICK SERVICE VALVES FOR BRAKING SYSTEMS

[75] Inventors: Clive A. Rathband; Jack Washbourn; David J. Wickham, all of London, England

[73] Assignee: Westinghouse Brake & Signal Co. Ltd., Chippenham, England

[21] Appl. No.: 965,789

[22] Filed: Dec. 4, 1978

[30] Foreign Application Priority Data

Dec. 15, 1977 [GB] United Kingdom ............ 52239/77

[51] Int. Cl.² .......................................... B60T 15/42
[52] U.S. Cl. ..................................... 303/38; 303/82
[58] Field of Search ................................ 303/37–39, 303/69, 82, 83

[56] References Cited

U.S. PATENT DOCUMENTS

| | | | |
|---|---|---|---|
| 1,487,692 | 3/1924 | Thomas | 303/37 |
| 4,070,068 | 1/1978 | Wickham | 303/38 X |
| 4,103,977 | 8/1978 | Wickham | 303/38 |

Primary Examiner—Duane A. Reger
Attorney, Agent, or Firm—Larson, Taylor and Hinds

[57] ABSTRACT

A continuous quick service valve arrangement for a direct release brake control system is provided with a sensing valve responsive to reductions of brake pipe pressure in relation to a reference pressure to apply fluid under pressure via a choke to a pulsating device which operates a quick service valve to drive pulses of air out of the brake pipe for as long as the brake pipe pressure continues to reduce for a brake application, the pulsating device is operated by a biassed member which when operated by being displaced in response to attainment of a certain pressure in a volume supplied by the sensing valve presents a greater area to the volume and opens a discharge path for the volume to permit the member to repetitively operate and reset.

5 Claims, 3 Drawing Figures

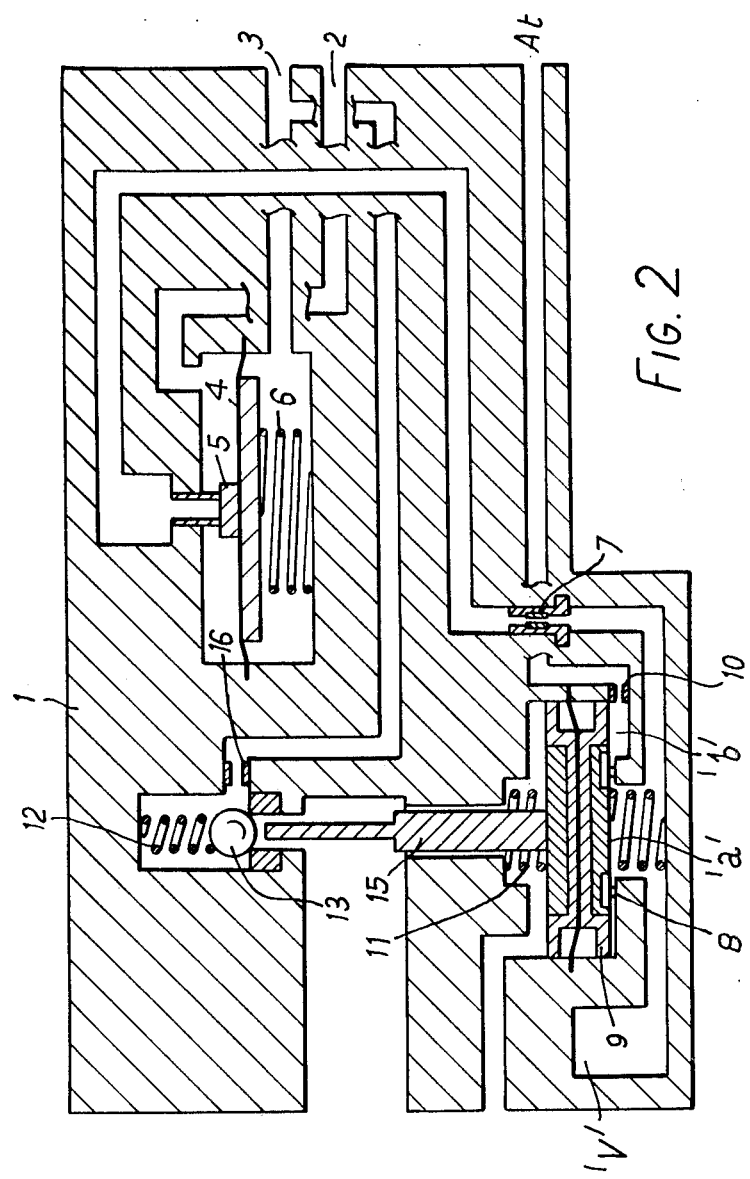

CONTINUOUS QUICK SERVICE VALVES FOR BRAKING SYSTEMS

This invention relates to quick service in vehicle brake control.

In the specification of U.S. Pat. No. 4,070,068, there is described and claimed in fluid pressure controlled apparatus for a vehicle braking system controlled by pressures in a brake pipe, valve apparatus for improved continuous quick service operation, comprising a reference pressure signal input port and a brake pipe pressure signal input port, pressure difference sensing means for continuously sensing and responding to pressure differences between the pressure signals at said signal input ports, pulsating means operative when energised to discharge repetitive pulses of air from the brake pipe, and means responsive to sensed attainment of a predetermined pressure difference by said sensing means to effect energisation of said pulsating means so long as said sensed predetermined difference continues.

In the arrangement described in the aforementioned patent, pulsating means is energised by brake pipe pressure supplied via a valve controlled by a pressure difference sensing means.

According to the present invention, there is provided apparatus for improved quick service operation in a fluid pressure operable vehicle braking system which operates to make brake applications in response to reductions of fluid pressure in a brake pipe, the apparatus including a quick service valve having a brake pipe pressure input port and a port connected to atmosphere, a pressure difference sensing device responsive to a reduction of fluid pressure in the brake pipe in relation to the fluid pressure at a reference pressure input port to open a further valve to apply fluid pressure via a first restriction to a pulsating device, the pulsating device comprising a volume, a pressure responsive member having a first side connected to atmosphere and a second side having a first area subject to the pressure in said volume and a second area connected via a further restriction to atmosphere, said member being displaceable in response to accumulated pressure in said volume applied to said first area to on the one hand open said quick service valve and on the other hand to interconnect said areas to permit reduction of pressure in said volume via said further restriction with resulting reclosure of the quick service valve.

Said reference pressure may be quick action chamber pressure for an emergency portion associated with a direct release triple valve.

In order that the invention may be more clearly understood and readily carried into effect, the same will be further described by way of example, with reference to the accompanying drawings, of which:

FIG. 2, illustrates a valve apparatus for improved quick service operation in accordance with the invention.

Before describing the invention, it will be understood that the continuous quick service valve to be described is one which is intended to provide improved propagation in association with railway vehicle braking apparatus, especially where such apparatus is employed with at least one control valve on each vehicle of a long train wherein propagation times for braking tend to cause uneven braking along the length of the train in response to a reduction of brake pipe pressure at one end thereof.

In the specification of U.S. Pat. No. 3,707,314 there is described a typical triple valve apparatus with which the present continuous quick service valve is intended to operate.

A typical emergency valve portion for use in conjunction with a triple valve of the general type referred to above, with reference to the specification of U.S. Pat. No. 3,707,314 is described in some detail in the specification of U.S. Pat. No. 4,025,125.

In its essentials, the apparatus described therein comprises a pressure responsive member separating a chamber at brake pipe pressure from a chamber at a quick action chamber reference pressure. These two chambers are ordinarily maintained at equal pressures and the pressure responsive member is responsive only to at least a predetermined change of brake pipe pressure in a given time to open a brake cylinder valve to provide a communication between a fluid pressure reservoir and a brake cylinder and to open a vent valve which is effective to vent the brake pipe to thereby effect an emergency brake operation. It will be appreciated moreover that the rate of change of brake pipe pressure in relation to the quick action chamber pressure, to effect such an emergency operation, is substantially greater than the rate of change which normally is effected to operate the associated service triple valve to produce a normal service braking operation.

Figure 1:
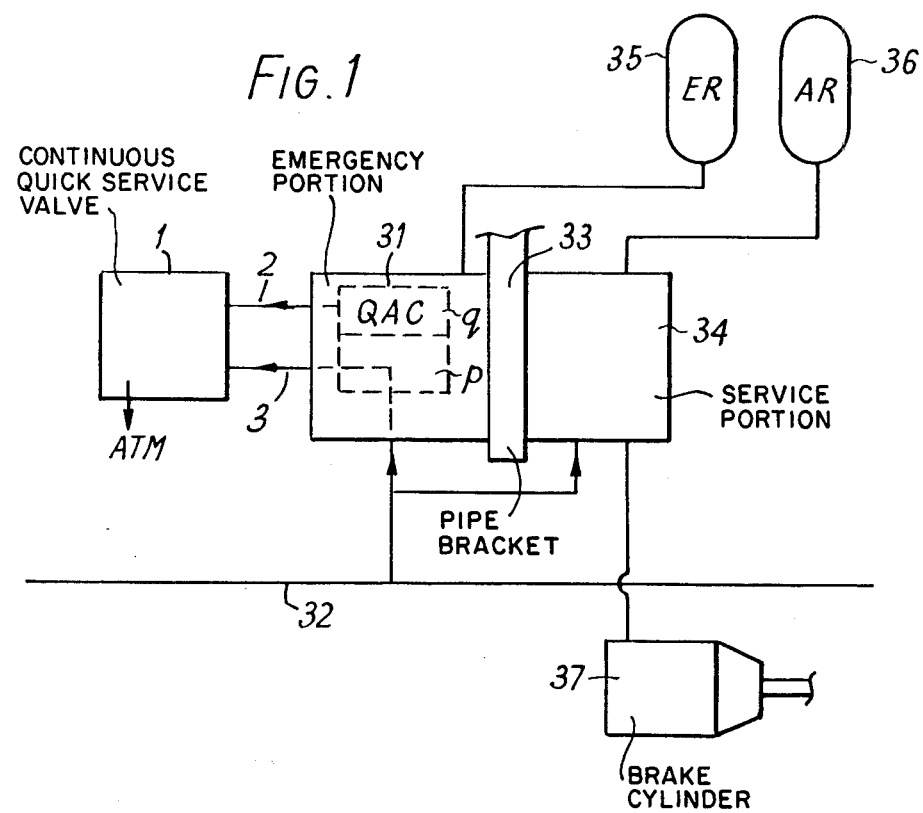
FIG. 1, illustrates in diagrammatical form a brake control valve apparatus to which the present invention is especially intended to be applied.

The apparatus 1, in accordance with the present invention, is therefore assumed to be mounted alongside an emergency portion of fluid operable brake control valve apparatus such as described in the second aforementioned patent specification, and as illustrated in diagrammatical form at 31, 33, 34 in FIG. 1. The reference pressure signal input port 2 is connected to receive a signal q from the quick action chamber (QAC) of the emergency portion 31 and the brake pipe pressure signal input port 3 being connected to receive a signal p from the brake pipe 32.

The pipe bracket upon which the emergency portion is mounted, is represented by reference 33 and this also carries a triple valve 34 as the service portion of the control valve apparatus. Emergency and auxiliary reservoirs 35 and 36 are shown connected to the emergency and service portions, and the output of the service portion, which, in the event of an emergency valve operation, is also supplemented by emergency reservoir air, is applied to a brake cylinder represented by reference 37. It will be appreciated from the aforementioned patent specifications that, for a normal service application, the emergency portion provides a path via which the quick action chamber pressure is enabled to follow reductions of brake pipe pressure. Only when the brake pipe pressure falls at more than a prescribed rate is the emergency portion operated to effect rapid venting of the brake pipe and connection of the emergency reservoir to the brake cylinders to supplement a full service application.

The continuous quick service valve apparatus to be described compares the brake pipe pressure with a reference pressure and in the preferred embodiment, the reference pressure is the aforementioned quick action chamber pressure of the emergency portion. Furthermore, the quick action chamber also forms a source of air for energising the pulsating device which releases pulses of air from the brake pipe to atmosphere at a desired rate to assist the propagation of a brake application along the train.

Referring now to FIG. 2, the quick service valve has a reference pressure input port 2 which is connected to the quick action chamber of the emergency portion referred to above, and a brake pipe pressure signal input port 3 which is connected to the brake pipe, the pressure in which controls the operation of the triple valve and the emergency portion associated therewith. The input port 3 is connected to the underside of a diaphragm 4 of a diaphragm valve 5 which is biassed by a light spring 6 into the closed position as shown under normal circumstances. The upperside of the diaphragm 4 is connected to the reference pressure input port 2 and the diaphragm valve 5 is such that, when unseated, it provides a communication from the reference pressure input port 2 via a suitable choke 7 to a volume 'v' in communication with a smaller area 'a' of a pulsating device. The area 'a' is defined by an annular seat 8 and when a piston 9 is lifted off this seat by pressure over the area 'a', it presents a substantially greater area consisting of areas 'a' and a peripheral area 'b' to the pressure, at the same time providing a path for the discharge of accumulated air to atmosphere via a suitably callibrated choke 10. The pulsating device comprises, as aforementioned, a diaphragm piston 9 and this piston is normally biassed by a spring 11 into the lowermost position, as shown, whereby it presents the smaller area 'a' to air accumulating air pressure supplied via the choke 7. Connected to the piston 9, there is an upwardly extending stem 15 which, on being raised by the piston 9, is operable to unseat a ball valve 13 against the closing force of a light spring 12. This ball valve is normally such as to maintain closed a communication between the brake pipe and atmosphere via a choke 16, provided upstream of the valve 13.

In operation of the apparatus, when a predetermined difference of pressure exists between the brake pipe and quick action chamber resulting from a reduction of brake pipe pressure to initiate a service brake application, whilst no emergency brake operation is initiated, diaphragm valve 5 is unseated by the downward movement of the diaphragm 4 and a small flow of air from the quick action chamber takes place via the choke 7. This results in a timed accumulation of pressure in the volume beneath the small area 'a' of the piston 9 and when the downward bias thereon is overcome, the piston 9 raises with a snap action due to the instantaneous increase from 'a' to 'a' plus 'b' of the area presented to the air beneath it. This is accompanied by opening of the valve 13 to provide a communication via the choke 16 to atmosphere for air from the brake pipe. Whilst the piston 9 is in the raised position, a discharge of the air beneath the piston 9 can take place via the callibrated choke 10 which permits reduction of pressure under the piston 9 at a rate which is such that it cannot be replenished by flow from the choke 7, the piston 9 descends again thereby closing the valve 13 and reducing the area presented to the volume beneath the piston 9 to the smaller area 'a'. This action continues repetitively for as long as there is a predetermined predominance of quick action chamber pressure above brake pipe pressure across the diaphragm 4.

By virtue of the discharge of brake pipe pressure to atmosphere being of a pulsating nature, after each such pulse, the apparatus has a short interval wherein brake pipe air is not being discharged and the system is able to sense the state of affairs and if possible stabilise in accordance with the "signal" in the brake pipe. The fact of utilising air from the quick action chamber to supply the pulsating device results in what amounts to an element of negative feedback in the system and this contributes to the overall stability of the arrangement.

Whilst the reference pressure in the present example is quick action chamber pressure, it will be appreciated that this is only so in the present example as a matter of convenience, as it enables the continuous quick service valve to be readily associated with the emergency portion. In apparatus where no such emergency portion is provided, for example, the continuous quick service valve arrangement may be associated with the service portion and in such circumstances, the reference pressure might be the auxiliary reservoir pressure and preferably, though not necessarily, the pulsating means would then be also supplied by air derived from the auxiliary reservoir.

Figure 3:
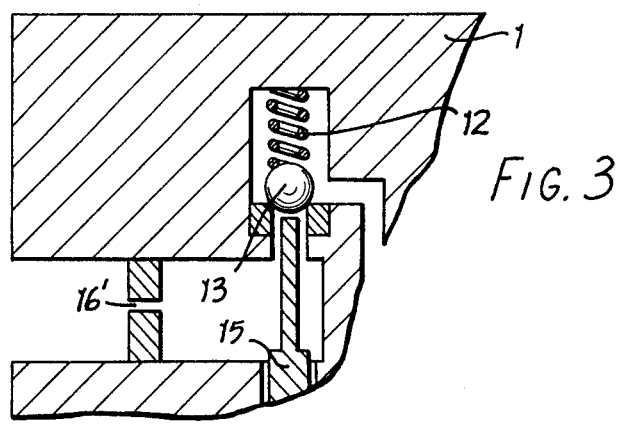
FIG. 3 is a fragmented view of FIG. 2, illustrating a modification.

Whilst in the presently described example of a continuous quick service valve, a choke 16 is provided upstream of the valve 13, which is provided to have atmosphere on one side and brake pipe pressure on the other, this may not necessarily be so. The choke 16 has the effect of limiting the rate of fall of brake pipe pressure such that at no time does the quick service valve precipitate an unwanted emergency brake application. By alternatively providing the choke downstream of the valve 13, as shown at 16' in FIG. 3, a volume might be created downstream which is nevertheless still connected to atmosphere via the choke 16'. By such means, it will be appreciated that by designing the pulsing rate, the size of such volume and the size of the choke, the initial pulse of air which is discharged from the brake pipe at the commencement of an application may be arranged to consist of a substantially greater volume of air than the subsequent immediately following pulses of air. The valve 13 thereby can operate to provide the initial substantially greater drop which may otherwise need to be provided by a separately operable but once-for-all quick service volume.

Having thus described our invention what we claim is:

1. Apparatus for improved quick service operation in a fluid pressure operable vehicle braking system which operates to make brake applications in response to reductions of fluid pressure in a brake pipe, the apparatus including a quick service valve having a brake pipe pressure input port and a port connected to atmosphere, a pressure difference sensing device responsive to a reduction of fluid pressure in the brake pipe in relation to the fluid pressure at a reference pressure input port to open a further valve to apply fluid pressure from a source distinct from the brake pipe via a first restriction to a pulsating device, the pulsating device comprising a volume receiving the fluid pressure applied to the pulsating device, a pressure responsive member having a first side exposed continuously to atmospheric pressure and a second side having a first area subject to the pressure in said volume and a second area connected via a further restriction to atmosphere, said member being displaceable in response to accumulated pressure in said volume applied to said first area to, on the one hand, open said quick service valve and, on the other hand, to inter-connect said areas to permit reduction of pressure in said volume via said further restriction with resulting reclosure of the quick service valve and repetitive action during continued reduction of fluid pressure in the brake pipe.

2. Apparatus as claimed in claim 1, wherein said reference pressure is quick action chamber pressure associated with an emergency portion of a brake control.

3. Apparatus as claimed in claim 1 or claim 2, a third restriction being provided between the brake pipe and said quick service valve.

4. Apparatus as claimed in claim 1 or 2, a third restriction being provided downstream of the quick service valve.

5. Apparatus as claimed in claim 4, a volume being provided between the quick service valve and the third restriction such that the reduction of brake pipe pressure resultant upon a first pulsation is greater than for subsequent pulsations consequent upon a given brake pipe pressure reduction.

* * * * *